(12) United States Patent
Nivendkar et al.

(10) Patent No.: US 12,414,098 B2
(45) Date of Patent: Sep. 9, 2025

(54) BEAM-BASED COMMUNICATION IN NETWORK NODES

(71) Applicant: Samsung Electronics Co., Ltd., Suwon-si (KR)

(72) Inventors: Swapnil Santosh Nivendkar, Bangalore (IN); Koustav Roy, Bangalore (IN); Shubham Khunteta, Bangalore (IN); Arijit Sen, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 503 days.

(21) Appl. No.: 17/522,454

(22) Filed: Nov. 9, 2021

(65) Prior Publication Data
US 2022/0217693 A1    Jul. 7, 2022

(30) Foreign Application Priority Data

Jan. 7, 2021 (IN) .............................. 202141000797

(51) Int. Cl.
*H04W 72/044* (2023.01)
*H04W 4/40* (2018.01)

(52) U.S. Cl.
CPC ............ *H04W 72/046* (2013.01); *H04W 4/40* (2018.02)

(58) Field of Classification Search
CPC ..... H04W 72/046; H04W 4/40; H04W 40/20; H04W 40/38
See application file for complete search history.

(56) References Cited

U.S. PATENT DOCUMENTS

| 6,795,014 B2 | 9/2004 | Cheong |
| 7,167,715 B2 | 1/2007 | Stanforth |

(Continued)

FOREIGN PATENT DOCUMENTS

| CN | 104169987 A | 11/2014 |
| CN | 109891936 A | 6/2019 |
| WO | 2020/062183 A1 | 4/2020 |

OTHER PUBLICATIONS

Choi, et al., "Millimeter Wave Vehicular Communication to Support Massive Automotive Sensing," IEEE Communications Magazine (vol. 54, Issue: 12, Dec. 2016), May 18, 2016, 7 pages.

(Continued)

*Primary Examiner* — Yemane Mesfin
*Assistant Examiner* — Salma Ayad

(57) ABSTRACT

A method of beam-based communication amongst a plurality of network nodes comprises detecting, by a subject node, a presence of a first set of nodes for beam-based communication, and receiving a list of a second set of nodes from at least a first node of the first set of nodes. Further, the method includes identifying at least a second node in the second set of nodes that is not detectable for beam-based communication by the subject node. The method comprises generating a distance-based mapping including distance information relating to the first set of nodes and the second node, from the subject node. Further, the method comprises transmitting, via beam-based communication by the subject node, content to a destination node based on a communication path determined using the distance-based mapping, the destination node being a node of one of the first set of nodes and the at least second node.

16 Claims, 10 Drawing Sheets

(56) References Cited

U.S. PATENT DOCUMENTS

| | | |
|---|---|---|
| 8,352,111 B2 | 1/2013 | Mudalige |
| 8,935,094 B2 | 1/2015 | Rubin et al. |
| 9,361,528 B2 | 6/2016 | Nonaka et al. |
| 10,237,874 B2 | 3/2019 | Mok et al. |
| 10,686,636 B2 | 6/2020 | Bowen et al. |
| 11,234,145 B2 | 1/2022 | Hahn et al. |
| 11,272,426 B2 | 3/2022 | Wu et al. |
| 11,540,283 B2 | 12/2022 | Park |
| 2013/0079953 A1 | 3/2013 | Kumabe |
| 2013/0100852 A1 | 4/2013 | Jeon et al. |
| 2013/0188513 A1 | 7/2013 | Vasseur et al. |
| 2015/0039174 A1 | 2/2015 | Takahashi et al. |
| 2015/0127189 A1 | 5/2015 | Mehr et al. |
| 2016/0278065 A1 | 9/2016 | Kim et al. |
| 2017/0093687 A1* | 3/2017 | Wu .................. H04L 45/12 |
| 2018/0188725 A1 | 7/2018 | Cremona et al. |
| 2019/0018419 A1* | 1/2019 | Lee ................ G08G 1/096708 |
| 2019/0053133 A1* | 2/2019 | Abouelseoud ...... H04W 40/244 |
| 2020/0153494 A1 | 5/2020 | Park et al. |
| 2021/0120555 A1* | 4/2021 | Badic .................. H04W 72/12 |
| 2021/0410164 A1 | 12/2021 | Zhou |
| 2022/0095198 A1* | 3/2022 | Zhang .................. H04W 40/20 |
| 2022/0116108 A1* | 4/2022 | Matsuo ................ H04L 5/0048 |
| 2023/0194648 A1* | 6/2023 | Miao .................... H04W 4/023 |
| | | 455/456.1 |
| 2023/0362780 A1* | 11/2023 | Li .......................... H04L 5/00 |

OTHER PUBLICATIONS

MacLachlan, "Tracking Moving Objects From a Moving Vehicle Using a Laser Scanner," Carnegie Mellon University, Jun. 23, 2005, 45 pages.

Office Action dated Jul. 18, 2022 in connection with India Patent Application No. 202141000797, 5 pages.

International Search Report of the International Searching Authority in connection with International Application No. PCT/KR2021/013673 issued Jan. 7, 2022, 3 pages.

\* cited by examiner

BEAM-BASED COMMUNICATION IN NETWORK NODES

CROSS-REFERENCE TO RELATED APPLICATION

This application is based on and claims priority under 35 U.S.C. § 119 to Indian Patent Application number 202141000797, filed on Jan. 7, 2021, in the Indian Patent Office, the disclosure of which is incorporated by reference herein in its entirety.

BACKGROUND

1. Field

The present disclosure, in general, relates to beam-based communication and, in particular, relates to beam-based communication amongst a plurality of mobile network nodes.

2. Description of the Related Art

With advances in technology, inter-vehicle communication is one of the key areas which has witnessed exponential growth in recent times. Amongst several applications, platoon management is one key application area of inter-vehicle communication techniques.

Communication techniques for platoon management relate to establishing communication links amongst vehicles travelling in a single lane. Thus, management of wave blocking is simple in Platoon as vehicles are not scattered in multiple lanes. Platoons serve a specific purpose and create small groups based on the similar purpose (e.g., trucking).

However, such techniques do not handle complete connectivity of all the vehicles on the road. The techniques for platoon management only apply in one direction and do not handle vehicles in multiple lanes. For instance, techniques to achieve data flow in all connected vehicles present in multiple lanes on the road are not defined by platooning.

Thus, there is a need for a solution that overcomes the above deficiencies.

SUMMARY

This summary is provided to introduce a selection of concepts, in a simplified format, that are further described in the detailed description of the disclosure. This summary is neither intended to identify key or essential inventive concepts of the disclosure and nor is it intended for determining the scope of the disclosure.

In an example embodiment, a method of beam-based communication amongst a plurality of network nodes is disclosed. The method comprises detecting, by a subject node, a presence of a first set of nodes for beam-based communication. The method further comprises receiving, in response to a request sent to the first set of nodes by the subject node, a list of a second set of nodes from at least a first node of the first set of nodes, the second set of nodes being detectable for beam-based communication by the first node. Further, the method includes identifying at least a second node in the second set of nodes that is not detectable for beam-based communication by the subject node. The method further comprises generating a distance-based mapping including distance information relating to the first set of nodes and the second node, from the subject node. Further, the method comprises transmitting, via beam-based communication by the subject node, content to a destination node based on a communication path determined using the distance-based mapping, the destination node being a node of one of the first set of nodes and the at least second node.

In another example embodiment, a network node comprising a storage unit, a communication unit, and a controller, wherein the controller is configured to implement the above methods, is disclosed.

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
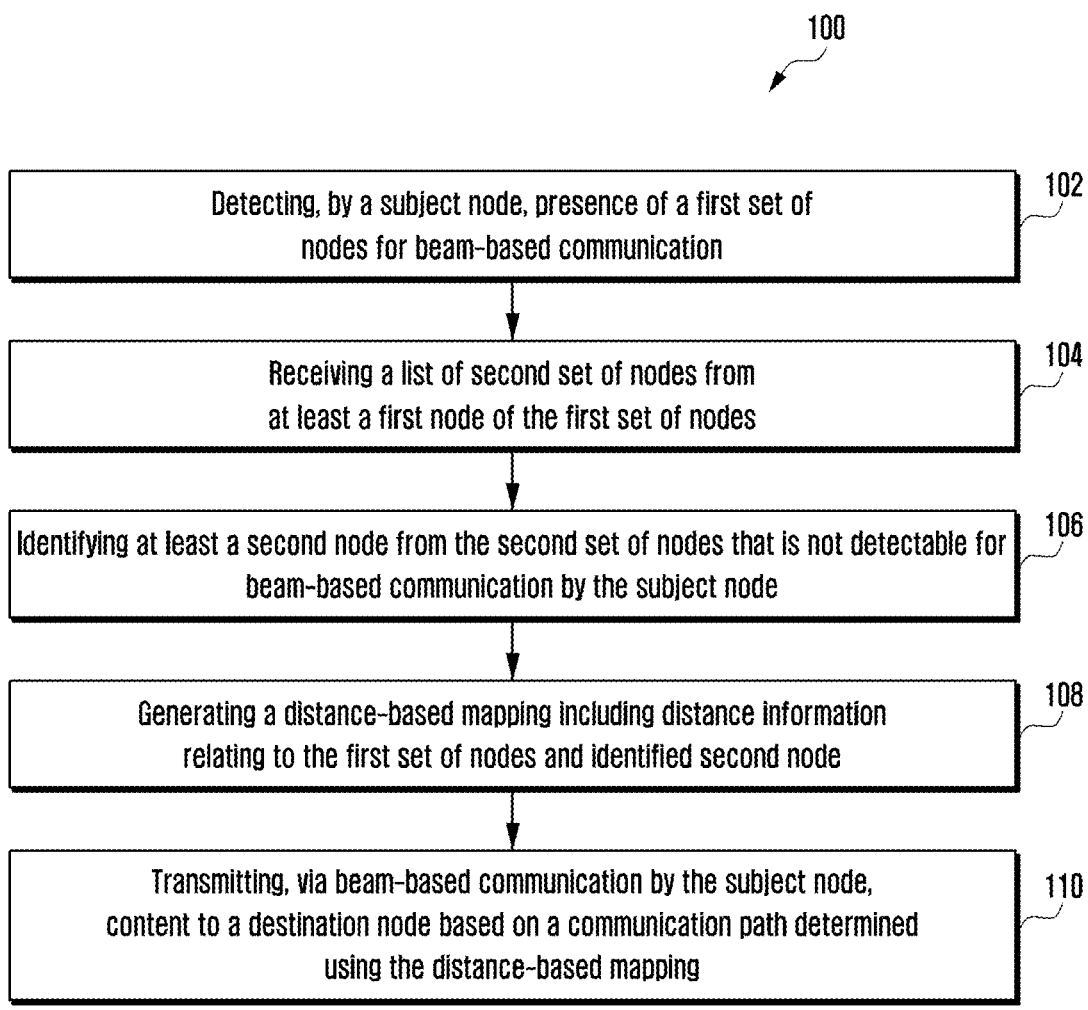
FIG. 1 illustrates a method of beam-based communication amongst a plurality of network nodes, according to an embodiment of the present subject matter.

Further, skilled artisans will appreciate that elements in the drawings are illustrated for simplicity and may not have been necessarily drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

For promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

FIG. 1 illustrates a method 100 of beam-based communication amongst a plurality of network nodes, according to an embodiment of the present subject matter. In an example, aspects of the method 100, as described herein, may be implemented by one or more components of a network node as illustrated and described in FIG. 6. The term "network node" has been interchangeably referred to as "node", in the forthcoming description.

In an example embodiment, the network nodes may be mobile, for example, in the case of communication nodes installed in vehicles for inter vehicle communication, and may implement the method 100 for performing beam-based communications amongst each other.

At step 102, the method 100 includes detecting a presence of a first set of nodes for beam-based communication by a subject node. Herein, the subject node may be any node from the plurality of network nodes. In an example, the first set of nodes may be understood as nodes that are detected by the subject node upon performing a scan. In said example, known techniques of discovering nodes may be implemented by the subject node for detecting the first set of nodes. For instance, in an example implementation, the subject node may be configured to transmit a broadcast message. In an example, the subject node may transmit the broadcast message using different technologies and frequencies, for example, New Radio (NR) frequencies (sub6 or mmWave), Long Term Evolution (LTE) frequencies, Bluetooth, Near Field Communication (NFC) technique, etc.

Upon receiving the broadcast message, in case a network node wishes to be discovered, the network node may be configured to transmit a response message to the subject node, thereby conveying its presence and willingness to be discovered. Accordingly, upon receiving the response message, in case the network node is a valid node, the subject node may detect the network node's presence. Herein, in a non-limiting manner, a valid node may be a network node that is authorized for communication with the subject node.

In an example, the plurality of network nodes, including the subject node, may be part of a platoon or a group. Accordingly, the following message formats may be used by the subject node and the network node during the discovery process.

Broadcast Message Transmitted by Subject Node:

```
{
    platoon (or group)_id: ""
}
```

Response Message Transmitted by Network Node:

```
{
    vehicle_id: ""
}
```

Platoon Join Acceptance Message Transmitted by Subject Node to the Network Node:

```
{
    vehicle_id : "",
    platoon_id : "",
    num_of_vehicle_in_platoon : "",
    subject/firstset/secondset/... node : "",
    source_of_platoon : "",
    destination_of_platoon : ""
}
```

Platoon Join Acceptance Message Transmitted by Subject Node to the Network Node:

```
{
    reject_cause : ""
}
```

In another example implementation, the network node may be configured to transmit a broadcast message to inform about its presence to other nodes, including the subject network node. In an example, the network node may use one or more of the techniques and frequencies described above for transmitting the broadcast message. In an example, the subject node may determine the validity of the network node. If determined to be valid, the subject node may allow the network node to join the platoon or group. On the other hand, if the network node is not a valid node, the subject node may not permit the network node to join the platoon or group. Herein, in a non-limiting manner, a valid node may be a network node that is authorized for communication with the subject node.

In an example, the plurality of network nodes, including the subject node, may be part of a platoon or a group. Accordingly, the following message formats may be used by the subject node and the network node during the discovery process.

Broadcast Message Transmitted by Network Node:

```
{
    vehicle_id : "",
    source : "",
    destination : "",
}
```

Platoon Join Acceptance Message Transmitted by Subject Node to the Network Node:

```
{
    platoon_id : "",
    num_of_vehicle_in_platoon : "",
    subject/firstset/secondset/... node : "",
    source_of_platoon : "",
    destination_of_platoon : ""
}
```

Platoon Join Rejection Message Transmitted by Subject Node to the Network Node:

```
{
    reject_cause : ""
}
```

Subsequent to the detection of the first set of nodes, in an example, the subject node may transmit a request to the first set of nodes for sharing information about the nodes present in the vicinity of/or discoverable by the first set of nodes.

At step 104, the method 100 includes, acquiring a list of a second set of nodes from at least a first node of the first set of nodes. In an example, the second set of nodes are the nodes that are detectable for beam-based communication by the first node As mentioned above, the subject node may transmit a request to the first set of nodes for sharing the information about the nodes present in the vicinity of/or discoverable by the first set of nodes. Accordingly, at least the first node of the first set of nodes may transmit the list of the second set of nodes to the subject node. In an example, the list of the second nodes may include an identifier corresponding to each of the second set of nodes. The list of the second set of nodes may further include information about a relative distance of each of the second set of nodes from the first node. In an example, the relative distance is calculated with reference from the first node.

At step 106, the method 100 includes identifying at least a second node in the second set of nodes that is not detectable for beam-based communication by the subject node. In an example, the second set of nodes may include at least a second node that is not detectable for beam-based communication by the subject node. This second node may be identified by the subject node based on the corresponding identifier of the second node. For instance, upon analyzing the list of the second set of nodes, the subject node may identify that the second node is not a part of the first set of nodes. In other words, the subject node may identify that the second node was not discovered in the first set of nodes.

At step 108, the method 100 includes, generating a distance-based mapping including distance information relating to the first set of nodes and the identified second node, from the subject node. In an example, the distance-based mapping may be generated based on a relative distance of each of the first set of nodes from the subject node, and the relative distance of the identified second node from the subject node.

In an example, the distance information of the first set of nodes and the second node from the subject node may be determined based on conventional techniques involving ultrasonic sensors, camera systems, and Global Positioning System (GPS) devices. In another example, the distance information of the first set of nodes and the second node from the subject node may be determined using the beams, as explained further in the description herein. In an example where conventional techniques are being used, this beam based method may be used for further calibrating the distance of the subject node from the first set of nodes and the second node.

Referring to the beam-based distance calculation, in an example, the relative distance of each of the first set of nodes from the subject node may be calculated based on a speed of the subject node, a speed of the node, a serving beam connecting the subject node with the node, a serving beam angle between the subject node and the node, and a horizontal reference. More particularly and without the calculation of the distances between the subject node and another node has been explained later in greater detail with reference to FIG. 2A-2D.

At step 110, the method 100 includes transmitting content to a destination node based on a communication path determined using the distance-based mapping. The destination node is a node of one of the first set of nodes and the second node. In an example embodiment, the method 100 includes transmission of the content by the subject node via beam-based communication techniques.

In an example, for transmitting the content to the destination node, the subject node determines one or more nodes present between the subject node and the destination node based on the distance-based mapping. In an example, the one or more nodes are the nodes lying in-between the distance between the subject node and the destination node. For example, if the destination node is 200 meters away from the subject node and there are 3 nodes which are 50 meters, 100 meters, and 150 meters, away from the subject node in the direction of the destination node, these 3 nodes would be determined by the subject nodes.

Subsequently, the communication path is determined based on one or more nodes. In an example, the communication path may be understood as an order of the nodes in which the content would be routed from the subject node to the destination node. Thus, in the communication path, the one or more nodes are arranged in ascending order of their distances from the subject node.

Subsequently, a beam-based communication link may be formed by the subject node with a first node of the communication path. Thereafter, the subject node may transmit the content and destination information of the destination node to the first node of the communication path over the beam-based communication link. In an example, the destination information includes an identity of the destination node and instructions to transmit the content to the destination node.

Upon receiving the content and the destination information, the first node of the communication may subsequently transmit the content and destination information to the next node in the communication path using a distance-based mapping maintained at its own end. The next node may accordingly analyze the communication path details and may transmit the content to the next node/destination node, as applicable.

In an example, the first node of the communication path may determine non-availability of the destination node for beam-based communication with the first node of the communication path. In said example, the first node of the communication path may identify a second node of the communication path that is available for beam-based communication with the first node of the communication path. Accordingly, the first node of the communication path may form a link with the second node of the communication path. Subsequently, the first node of the communication path transmits the content and the destination information to the second node of the communication path.

As mentioned above, the nodes may be mobile and accordingly, in an example, one or more nodes may overtake each other. Occurrence of this during the transmission may cause a disruption in the transmission of the content. Accordingly, to avoid disruption in the transmission of the content, the present subject matter provides for the following technique.

In an example, a set of neighboring nodes of the subject node includes the primary node and the secondary node. Herein, the primary node may be understood as an immediate neighbor of the subject node and the secondary node may be understood as an immediate neighbor of the primary node. Thus, referring to the above example, the two nodes that are at 50 meters and 100 meters distance from the subject node, are its neighboring nodes. In said example, the primary node is the node which is 50 meters away and the secondary node is the one which is 100 meters away. As would be appreciated, the set of neighboring nodes, in another example, may include nodes that are backward to the subject node.

In an example, the subject node may be transmitting content to the destination node. Accordingly, the subject node may have a beam-based communication link with the primary node and the primary node may have a beam-based communication link with the secondary node for transmitting the content to the destination node.

In the above example, the method may include, detecting, during the transmission of the content, the secondary node to be within a threshold distance from the subject node. The threshold distance, as referred to herein, may be implementation specific. In an example embodiment, the threshold distance may be 50 meters (not limited to this value). In another example embodiment, the value of the threshold distance may be determined based on an overall distance formed by the subject node, the first set of nodes, and the second set of nodes.

Subsequently, the method may include establishing a beam-based communication link with the secondary node, in response to detecting the secondary node to be within the threshold distance from the subject node. After the successful establishment of the beam-based communication link with the secondary node, the method may include terminating, by the subject node, the beam-based communication link with the primary node.

Figure 2A:
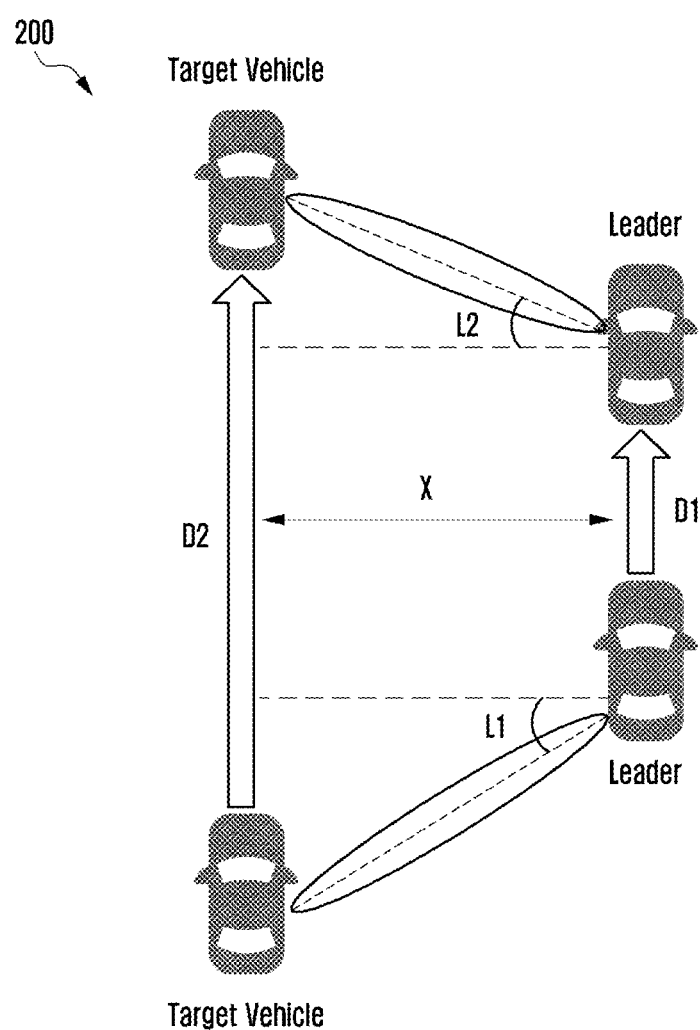
FIG. 2A illustrates a legend diagram depicting nodes whose distance from each other is to be calculated, according to an embodiment of the present subject matter.
Figure 2B:
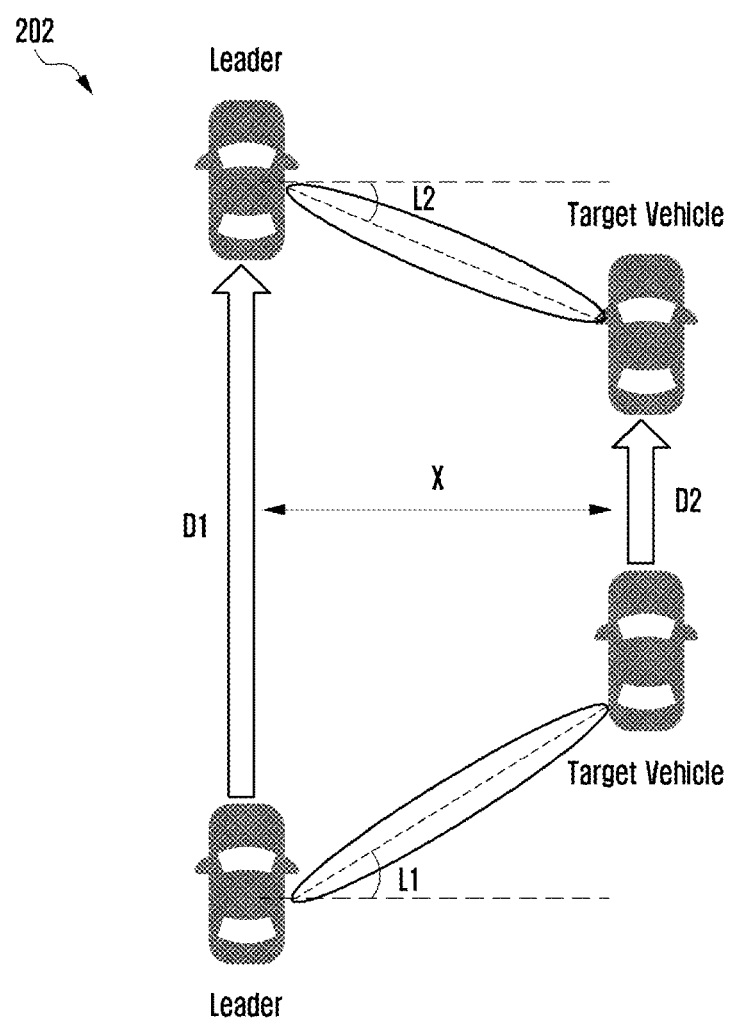
FIGS. 2B-2D illustrate example use cases for calculating distances between nodes, according to an embodiment of the present subject matter.
Figure 2C:
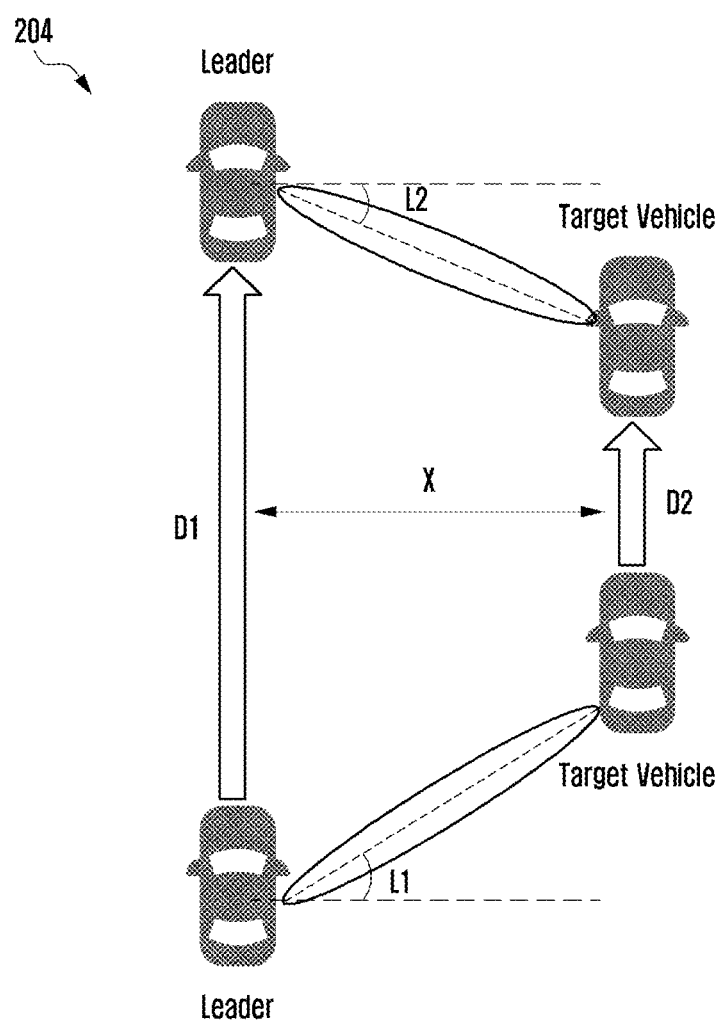
Figure 2D:
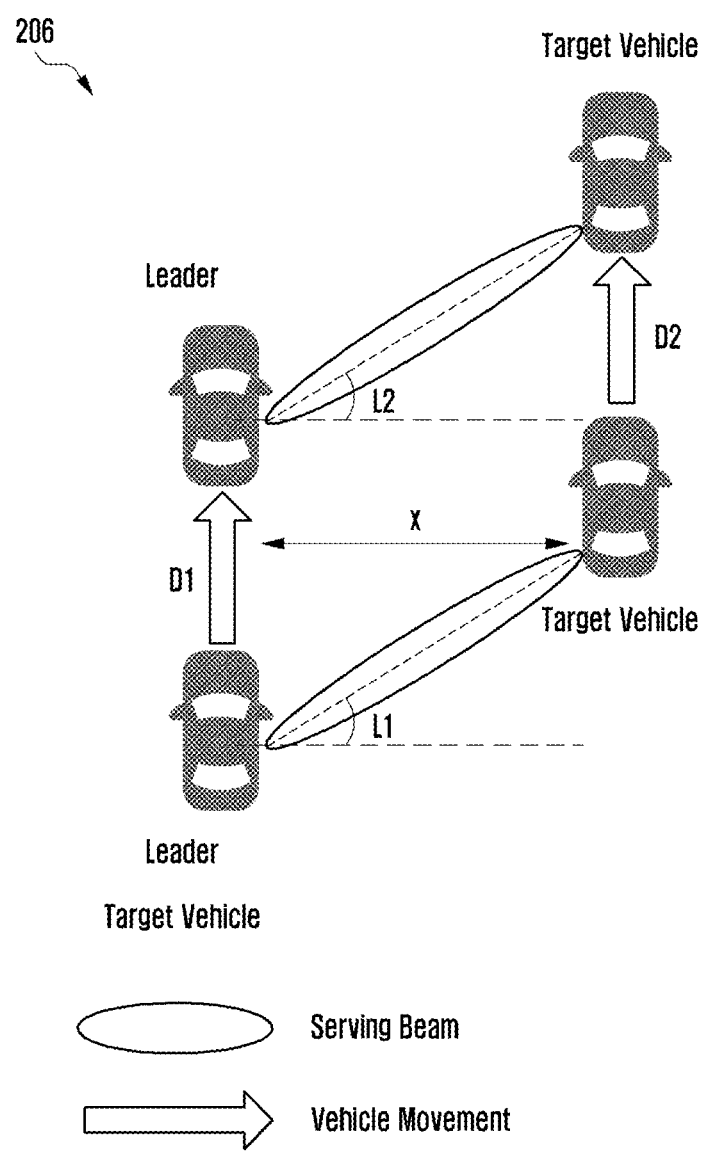

FIG. 2A illustrates a legend diagram 200 depicting nodes whose distance from each other is to be calculated, according to an embodiment of the present subject matter. FIGS. 2B-2D illustrate example use cases for calculating distances between nodes, according to an embodiment of the present subject matter. For the sake of explanation and in a non-limiting manner, the nodes are depicted as vehicles in the FIGS. 2A-2D.

Referring to FIGS. 2A-2D, a leader vehicle, "leader", and a target vehicle is shown. Herein, the leader may be the subject node and the target vehicle may be a node in the first set of nodes, as described in FIG. 1 For calculation of the distance between the leader and the target vehicle, an assumption is made that for a short period of time T, both the target vehicle and the leader are moving in a straight line. Furthermore, the representations used in the aforementioned figure are as follows:

D1: Distance covered by Leader in time T.
D2: Distance covered by Target Vehicle in time T.
X (Unknown Quantity): Horizontal distance between Leader and Target Vehicle.

L1: Serving Beam angle before distance calculation. (Value can be +/−)
L2: Serving Beam angle after time T. (Value can be +/−)
V1: Speed of Leader Vehicle.
V2: Speed of Target Vehicle.

It is also a pre-requisite that the target vehicle will send its average speed for time T to the leader. In a non-limiting example, the following scenarios of distance calculation may be possible.

Referring to the average velocity/distance covered, in an example, the Leader Vehicle can have a higher average velocity compared to the Target Vehicle, i.e., V1>V2. In another example, the Target Vehicle can have a higher average velocity compared to Leader, i.e., V1<V2. In yet another example, both the Leader and Target Vehicle have the same average velocity, i.e., V1=V2.

Referring to the initial position, in an example, the Leader may be ahead of the Target Vehicle. Accordingly, initially L1 will be positive (+ve). In another example, the Target Vehicle may be ahead of the Leader. Herein, initially L1 will be negative (−ve). In yet another example, the Target Vehicle may be at the same horizontal position as that of the Leader. Herein, initially L1 will be always 0.

Referring to the final position, in an example, the Leader may be ahead of the Target Vehicle. Herein, finally L2 will be negative (−ve). In another example, the Target Vehicle may be ahead of the Leader. Herein, finally L2 will be positive (+ve). In an example, the Target Vehicle may be at the same horizontal position as that of the Leader. Herein, finally L2 will be always 0.

Referring to FIG. 2A, a use case 202 is shown where the Target Vehicle average speed is greater than the Leader Vehicle average speed. In said use case, as depicted, the Target Vehicle Speed is more than the Leader Vehicle Speed i.e., V2>V1. Herein, the Leader was ahead of the Target Vehicle. Initially i.e., L1 will be positive (+ve) and finally the Target Vehicle is ahead of the Leader i.e., L2 will be positive (+ve). Now in said case, the value of X may be determined using the following equations:

$$D1 + X^* \tan(L1) + X^* \tan(L2) = D2 \qquad \text{Equation (1)}$$

$$V1^*T + X^* \tan(L1) + X^* \tan(L2) = V2^*T \qquad \text{Equation (2)}$$

From the above formula we can find out the value of X. Subsequently, X/cosine (L2) will give actual distance of the Target Vehicle from the Leader at time instant T.

Referring to FIG. 2B, a use case 204 is shown where the Leader's average speed is more than the Target Vehicle's average speed. In this case, the Leader's average speed is more than the average speed of the Target Vehicle speed, i.e., V1>V2. Herein, the Target Vehicle was ahead of the Leader. Accordingly, initially L1 will be negative (−ve) and finally the Target Vehicle is ahead of the Leader. That is, L2 will be negative (−ve). Now in said case, the value of X may be determined using the following equations:

$$V1^*T + X^* \tan(-L1) + X^* \tan(-L2) = V2^*T \qquad \text{Equation (3)}$$

From the above formula we can find out the value of X. X/cosine(L2) will give the actual distance of the Target Vehicle from the Leader at time instant T.

Referring to FIG. 2C, a use case 206 is depicted where the Leader and the Target Vehicle have the same average speed. As depicted, the Leader's average speed is the same as the Target Vehicle average Speed i.e., V1=V2. In such a scenario, the Leader may transmit a request to another node, for example, another vehicle, in the cluster of nodes with which the target vehicle has some relative speed.

Thus, as is explained above, according to aspects of the present subject matter, the subject node may leverage the serving beam existing between the subject node and a given node for calculating the distance.

Figure 3:
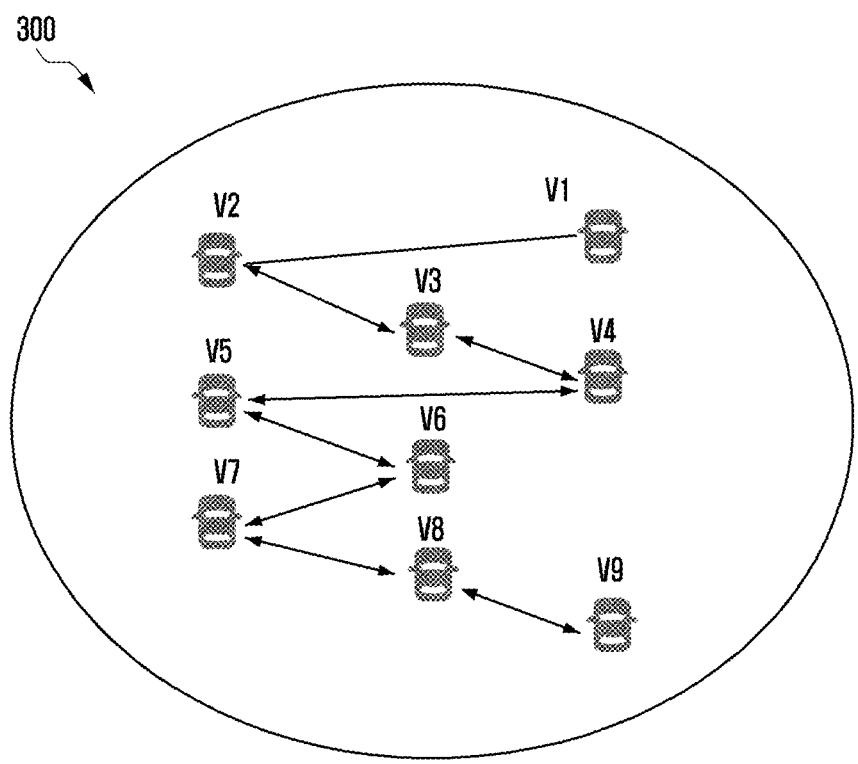
FIG. 3 illustrates a use case where a dynamic switch is occurring between the nodes, according to an embodiment of the present subject matter.
Figure 3:
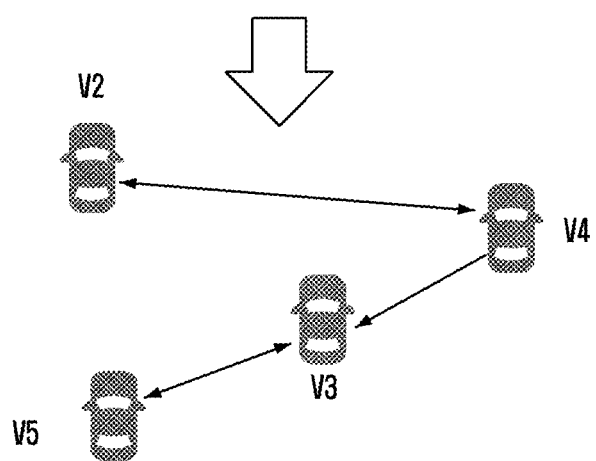

FIG. 3 illustrates a use case 300 where a dynamic switch is occurring between the nodes, according to an embodiment of the present subject matter. In an example, for ease of understanding, the dynamic switch scenario is explained by taking vehicles as examples of the network nodes. Accordingly, shown in the figure are a plurality of vehicles V1 to V9 and their respective beam-based communication links. Hereinafter, it is assumed that the number of vehicles forming communication links is 9 but the vehicle number is not limited to 9. The threshold should be decided based on performance and is implementation based.

Now, consider a scenario where when V4 is about to overtake V3. According to the aspects of the present subject matter, the following events would occur considering V2 to be the subject node. V2 would detect the presence of V4 within the threshold distance. Accordingly, V2 will establish a beam-based communication link with V4. After successful establishment of the beam-based communication link with V4, V2 would terminate its beam-based communication link with V3, while V3 and V4 continue to maintain their beam-based communication link.

Thus, initially the order was V2, V3, V4, and V5. After the switch, the order becomes, V2, V4, V3, and V5.

As may be gathered from above, before connection is lost new connections are made. This helps in saving signaling time since the vehicle that shall overtake another vehicle will always be in connection by leveraging the distance-based mapping. Thus, dynamic switching provides for a less cumbersome solution to keep updating the distance-based mapping. The network node of V1 to V9 continues to update distance-based mapping and can provide information on a vehicle (e.g., V4) that overtakes another vehicle that can be provided to other vehicles, including the Leader. For example, when an ambulance is driving in an emergency situation, mutual distance-based mapping among V1 to V9 is continuously updated to share the location of the ambulance in real time. In this situation, the other vehicles, including V1 to V9, recognize the location and approach of the ambulance and can make a way for the ambulance.

Figure 4:
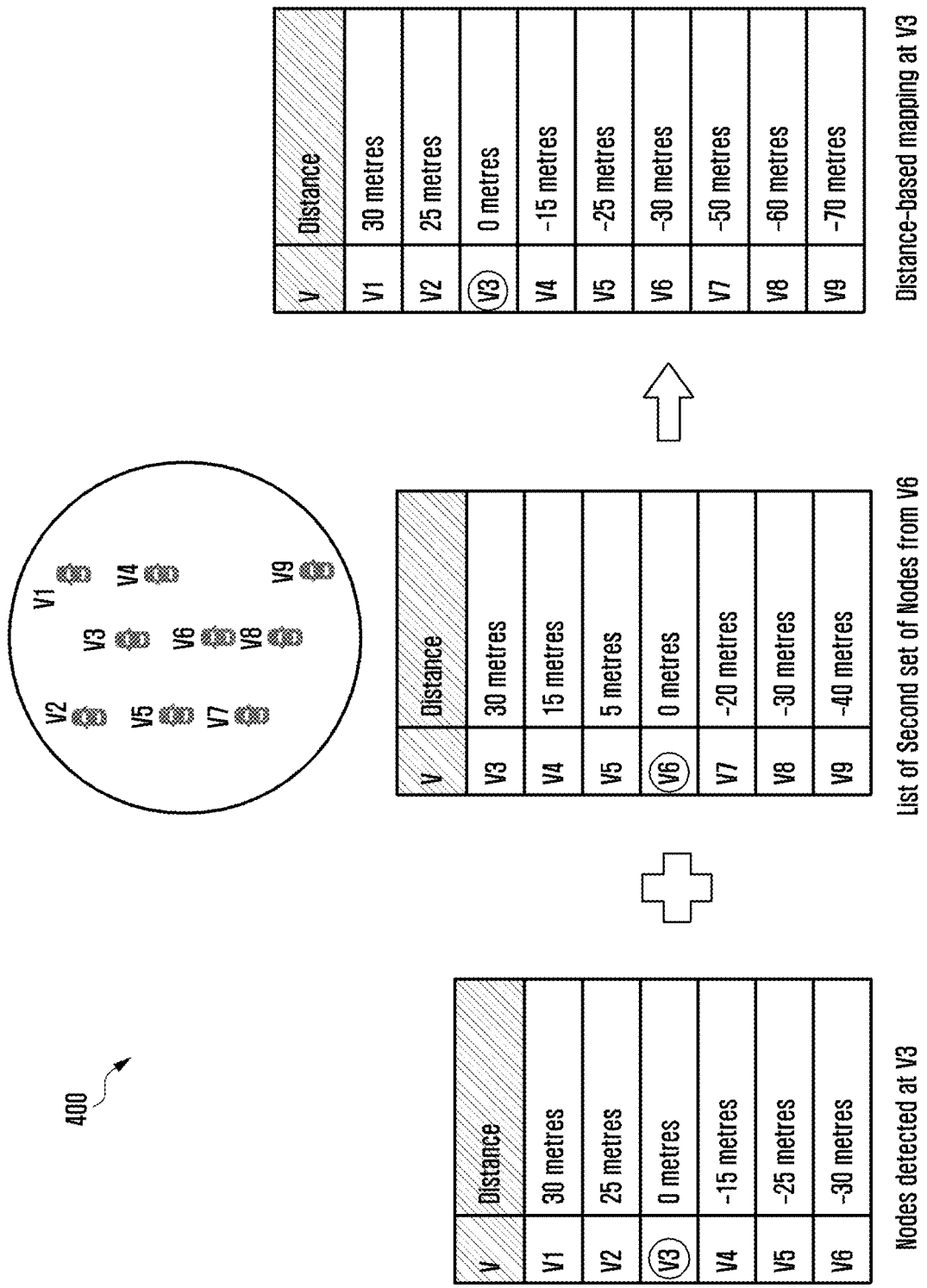
FIG. 4 illustrates a use case for creating the distance-based mapping, according to an embodiment of the present subject matter.

FIG. 4 illustrates a use case 400 for creating the distance-based mapping, according to an embodiment of the present subject matter. In said figure, for ease of understanding, a plurality of nodes has been depicted as a plurality of vehicles V1 to V9. Herein, V3 acts as a subject node, V6 acts as the first node, and V7 to V9 are examples of the second node, as described above in FIG. 1.

As shown, in an example, V3 may detect the presence of a first set of vehicles V1 to V6 in its vicinity. Also, V3 may make a request to all the vehicles V1 to V6 for sharing information about vehicles detected in their vicinity. As an example, V6 may share the list of the second set of nodes. This list may include some nodes that have already been detected by V3, and may also include nodes, such as nodes V7 to V9, that are not included in the scan by V3. As may also be noted, the list also includes the distances between V6 and the vehicles. Now, upon receiving the list from all the nodes of the first set of vehicles, V3 may generate the distance-based mapping.

Figure 5A:
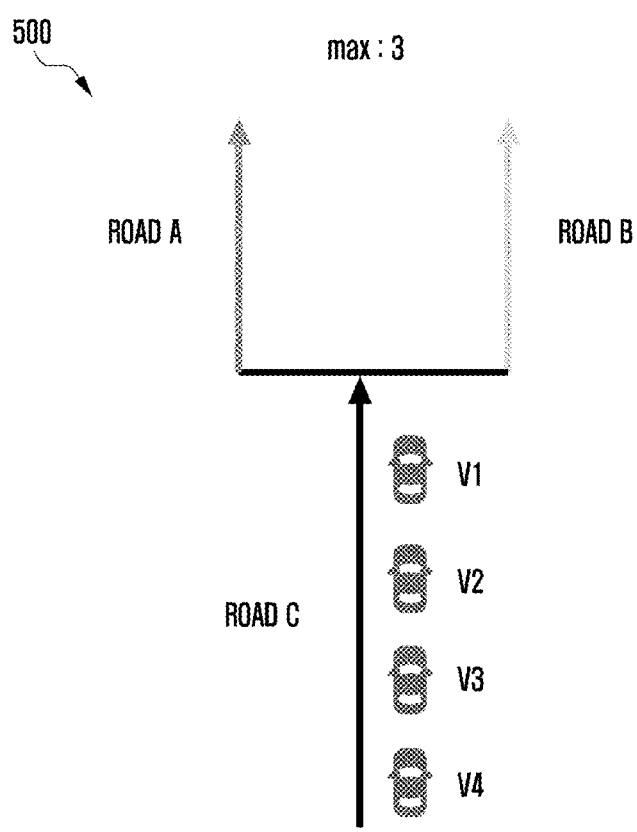
FIGS. 5A-5B illustrate a use case, according to an embodiment of the present subject matter.
Figure 5B:
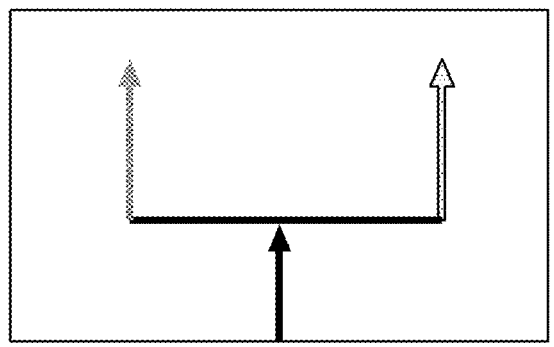
Figure 5B:
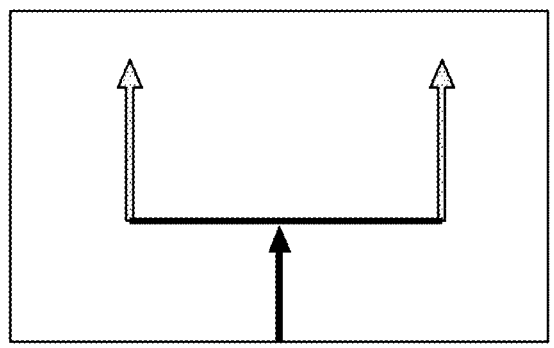
Figure 5B:
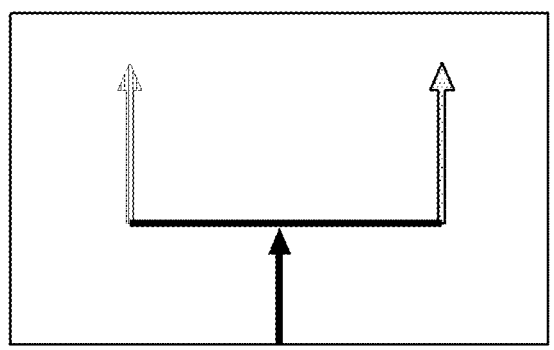

Referring to FIGS. 5A-5B, a use case 500, according to an embodiment of the present subject matter, is depicted. In use case 500, consider a scenario where 4 Cars are headed towards Road A whose max density is 3. Road A being empty currently is indicated as green for all 4 vehicles. Now, when the first 3 vehicles reach Road A, its occupancy is maxed out. Accordingly, when the 4th Vehicle reaches Road A, it may result in a traffic jam. In FIG. 5A, it is assumed that a number of vehicles causing traffic is 4 but the number of vehicles causing traffic is not fixed. The number can also vary based on the width of the road.

According to aspects of the present subject matter, different Maps for different vehicles may be provided. According to the proposed aspects, every vehicle gets a map from the vehicle ahead and said vehicle updates the map and sends it to the vehicle behind said vehicle, as per the distance-based mapping. Accordingly, Vehicle I would get a map about Road A being free, it updates its presence and sends it to V2. Now, V2 gets the map where Road A is coded blue and it updates it and sends it to V3, when entering the Road A. A similar process is done by V3. After 3 vehicles road A is maxed out. Therefore Vehicle 4 should get a map of Road A from V3 about Road A being full and re-route it to another route. So even before the 4 vehicles are on the road A, the map is able to predict that the situation for V4 is not going to be the same when it reaches there. Thus, the traffic jam can be avoided.

Figure 6:
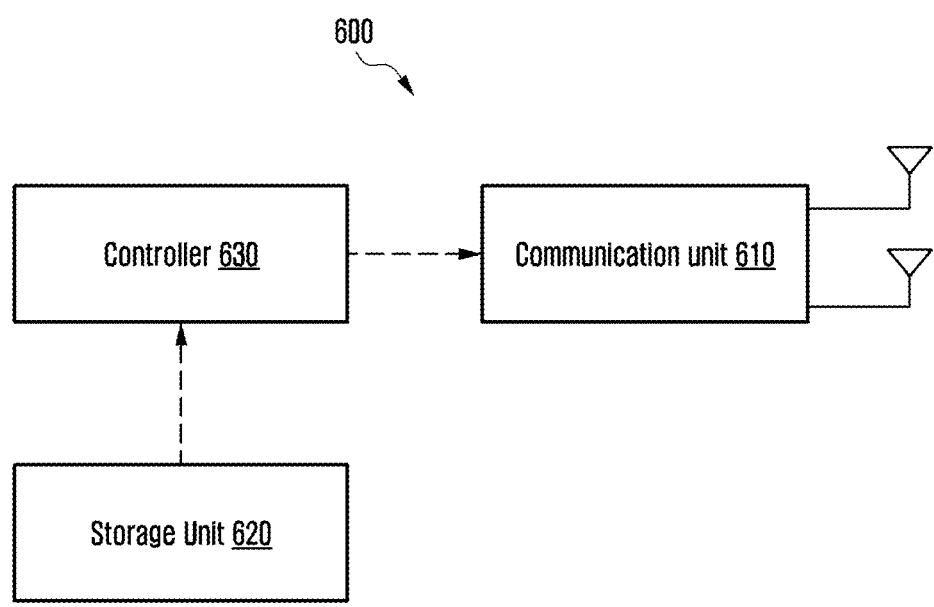
FIG. 6 illustrates a diagram of the configuration of a network node, according to an embodiment.

FIG. 6 illustrates a diagram of the configuration of a network node 600, according to an embodiment. The configuration of FIG. 6 may be understood as a part of the configuration of the network node 600. Hereinafter, it is understood that terms including "unit" or "er" at the end may refer to the unit for processing at least one function or operation and may be implemented in hardware, software, or a combination of hardware and software. Furthermore, in an example embodiment, the network node 600 may include a wireless terminal, such as a smartphone. In another example embodiment, the network node 600 may include a computing device implemented in vehicles for inter-vehicle communication. In the below description, the network node 600 may interchangeably be referred to as the subject node.

In an example, the network node 600 may transmit and receive wireless signals in a millimeter wave (mmWave) band (e.g., 28 GHz, 30 GHz, 38 GHz, or 60 GHz). In this case, to improve a channel gain, the network node 600 may perform beamforming. Here, the beamforming may include transmission beamforming and reception beamforming. That is, the network node 600 may assign directivity to a transmission signal or a reception signal. To this end, the network node 600 may select serving beams via a beam search or beam management procedure. After the serving beams are selected, communication may be performed via resources that are in the quasi co-located (QCL) relationship with resources used for transmitting the serving beams.

According to an embodiment, the network node 600 may transmit and receive wireless signals in a band other than the millimeter wave band. In other words, the band at which the network node 600 transmits and receives wireless signals is not limited to the millimeter wave band. In this case, the network node 600 may perform mutual communication with another entity, without performing beamforming.

In an example, the network node 600 may use any suitable radio access technology, such as long term evolution (LTE), LTE-Advanced, UMTS, HSPA, GSM, cdma2000, NR, WiMax, WiFi, and/or other suitable radio access technology. For purposes of example, various embodiments may be described within the context of certain radio access technologies. However, the scope of the disclosure is not limited to the examples and other embodiments could use different radio access technologies.

As shown in FIG. 6, in an example, the network node 600 may include a communication unit 610 (e.g., communicator or communication interface), a storage unit 620 (e.g., storage), and a controller 630 (e.g., at least one processor). By way of example, the terminal 120 may be a User Equipment, such as a cellular phone or other device that communicates over a cellular network (such as a 5G or pre-5G network or any future wireless communication network).

The communication unit 610 may perform functions for transmitting and receiving signals via a wireless channel. For example, the communication unit 610 performs a function of conversion between a baseband signal and a bit stream according to the physical layer standard of a system. By way of further example, when data is transmitted, the communication unit 610 generates complex symbols by encoding and modulating a transmission bit stream. Similarly, when data is received, the communication unit 610 restores a reception bit stream by demodulating and decoding a baseband signal. Furthermore, the communication unit 610 up-converts a baseband signal into an RF band signal and transmits the same via an antenna, and down-converts an RF band signal received via an antenna into a baseband signal. For example, the communication unit 610 may include at least one of a transmission filter, a reception filter, an amplifier, a mixer, an oscillator, a DAC, an ADC, and the like.

Also, the communication unit 610 may include or utilize a plurality of transmission and reception paths. In addition, the communication unit 610 may include at least one antenna array including a plurality of antenna elements. From the perspective of hardware, the communication unit 610 may include a digital circuit and an analog circuit (e.g., a radio frequency integrated circuit (RFIC)). Here, the digital circuit and the analog circuit may be implemented as one package. Also, the communication unit 610 may include a plurality of RF chains. In addition, the communication unit 610 may perform beamforming.

The communication unit 610 may transmit and receive a signal as described above. Accordingly, the entirety or a part of the communication unit 610 may be referred to as "transmitting unit," "receiving unit," "transceiving unit," "transmitter," "receiver," or "transceiver." Also, the transmission and reception performed via a wireless channel, which is described hereinbelow, may include the above-described processing performed by the communication unit 610.

The storage unit 620 may store data, such as a basic program, an application program, configuration information, and the like for operating the network node 600. The storage unit 620 may be configured as a volatile memory, a non-volatile memory, or a combination of a volatile memory and a non-volatile memory. In addition, the storage unit 620 may provide data stored therein in response to a request from the controller 630.

The controller 630 may control overall operations of the network node 600. For example, the controller 630 may transmit and receive signals via the wireless communication unit 610. Further, the controller 630 records data in the storage unit 620 and reads the recorded data. The controller 630 may perform the functions of a protocol stack required by a particular communication standard. To this end, the controller 630 may include at least one processor.

According to an example embodiment, the controller 630 may be configured to detect the presence of a first set of nodes for beam-based communication. Furthermore, the controller 630 may be configured to receive, in response to a request sent to the first set of nodes by the subject node, a list of a second set of nodes from at least a first node of the first set of nodes, the second set of nodes being detectable for beam-based communication by the first node. Furthermore, the controller 630 may be configured to identify at least a second node in the second set of nodes that is not detectable for beam-based communication by the subject node.

Furthermore, the controller 630 may be configured to generate a distance-based mapping including distance information relating to the first set of nodes and the second node, from the subject node. Furthermore, the controller 630 may be configured to transmit, via beam-based communication by the subject node, content to a destination node based on a communication path determined using the distance-based mapping, the destination node being a node of one of the first set of nodes and the at least second node.

In an example embodiment, for transmitting the content, the controller 630 may be further configured to determine one or more nodes present between the subject node and the destination node based on the distance-based mapping. Furthermore, the controller 630 may be configured to determine the communication path based on the one or more nodes, wherein in the communication path, the one or more nodes are arranged in ascending order of their distances from the subject node. Furthermore, the controller 630 may be configured to form a beam-based communication link with a first node of the communication path. Furthermore, the controller 630 may be configured to transmit the content and destination information of the destination node to the first node of the communication path, wherein the destination information includes an identity of the second node and instructions to transmit the content to the second node.

In an example embodiment, the list of the second set of nodes further comprises information about a relative distance of the second set of nodes from the first node.

In an example embodiment, the controller 630 is further configured to generate the distance-based mapping based on a relative distance of each of the first set of nodes from the subject node and the list of second set of nodes.

In an example embodiment, the controller 630 is further configured to calculate the relative distance between the subject node and each of the first set of nodes, wherein the distance between the subject node and a node from the first set of nodes is determined based on a speed of the subject node, a speed of the node, a serving beam angle between the subject node and the node.

In an example embodiment, a set of neighboring nodes of the subject node may include a primary node and a secondary node. The primary node may be an immediate neighbor of the subject node and the secondary node may be an immediate neighbor of the primary node. Herein, the subject node has a beam-based communication link with the primary node and the primary node has a beam-based communication link with the secondary node for transmitting content to the destination node. In said example embodiment, the controller 630 may be further configured to detect, during the transmission of the content, the secondary node to be within a threshold distance from the subject node. Furthermore, the controller 630 may be configured to establish a beam-based communication link with the secondary node, in response to detecting the secondary node to be within the threshold distance from the subject node. Furthermore, the controller 630 may be configured to terminate the beam-based communication link with the primary node, after successful establishment of the beam-based communication link with the secondary node.

While specific language has been used to describe the present disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of beam-based communication amongst a plurality of network nodes, the method comprising:
   detecting, by a subject node, a presence of a first set of nodes for beam-based communication;
   requesting, by the subject node to the first set of nodes, a list of a second set of nodes;
   acquiring the list of the second set of nodes from a first node of the first set of nodes, wherein the second set of nodes is detected from the first node by performing beam-based communication, and the list of the second set of nodes includes a physical distance of each node of the second set of nodes from the first node of the first set of nodes;
   identifying a second node in the second set of nodes that is not detectable for beam-based communication by the subject node;
   determining an arrangement of the first set of nodes and the second set of nodes in ascending order of physical distance from the subject node;
   generating a distance-based mapping including physical distance information using the list of the second set of nodes acquired from the first node of the first set of nodes;
   determining one or more nodes present between the subject node and a destination node based on the distance-based mapping;
   determining a first communication path including the one or more nodes, that are arranged in ascending order of distances from the subject node;
   transmitting content to the destination node based on the first communication path,
   wherein the destination node includes at least one of the first set of nodes or the second set of nodes;
   determining a movement of at least one node of the one or more nodes;
   updating, based on the movement, the distance-based mapping;
   determining, based on the updated distance-based mapping, a second communication path including the one or more nodes;
   transmitting content to the destination node based on the second communication path;
   receiving, by the subject node, from a node located in front of the subject node, a first map indicating a first travel route for the subject node;
   generating, by the subject node, based on the distance-based mapping, a second map indicating a second travel route for a node located behind the subject node; and
   transmitting, by the subject node, the second map to the node located behind the subject node, wherein the first travel route for the node located behind the subject node is different than the second travel route for the subject node,
wherein the plurality of network nodes are a group of vehicles traveling on multiple lanes of a road, and
wherein the first travel route and the second travel route are based on a traffic density of the lanes.

2. The method as claimed in claim 1, wherein the step of transmitting further comprises:
forming a beam-based communication link with a first node of the communication path; and
transmitting the content or destination information of the destination node to the first node of the communication path, wherein the destination information includes an identity of the destination node and instructions to transmit the content to the destination node.

3. The method as claimed in claim 2, further comprising:
determining non-availability of the destination node for beam-based communication with the first node of the communication path;
identifying a second node of the communication path that is available for beam-based communication with the first node of the communication path;
forming a link with the second node of the communication path; and
transmitting the content or the information to the second node of the communication path.

4. The method as claimed in claim 1, wherein the list of the second set of nodes further comprises information about a relative distance of the second set of nodes from the first node.

5. The method as claimed in claim 4, wherein the relative distance is calculated about the first node.

6. The method of claim 4, further comprising generating the distance-based mapping based on a relative distance of each of the first set of nodes from the subject node and the list of the second set of nodes.

7. The method as claimed in claim 6, further comprising:
calculating the relative distance between the subject node and each of the first set of nodes, wherein the relative distance between the subject node and a node from the first set of nodes is determined based on a speed of the subject node, a speed of the node, a serving beam angle between the subject node and the node.

8. The method as claimed in claim 1, further comprising:
detecting, during the transmission of the content, the second node to be within a threshold distance from the subject node;
establishing a beam-based communication link with the second node, in response to detecting the second node to be within the threshold distance from the subject node; and
terminating the beam-based communication link with the first node, after successful establishment of the beam-based communication link with the second node.

9. A subject node configured to perform beam-based communication with a plurality of network nodes, the subject node comprising:
communication circuitry;
at least one processor; and
memory for storing instructions that, when executed by the at least one processor individually or collectively, cause the subject node to:
detect a presence of a first set of nodes for beam-based communication, wherein to detect the presence of the first set of nodes, the instructions cause the subject node to, for each node of the first set of nodes:
request, by the subject node, to the first set of nodes, a list of a second set of nodes;
acquire the list of the second set of nodes from a first node of the first set of nodes, wherein the second set of nodes is detected from the first node by performing beam-based communication, and the list of the second set of nodes includes a physical distance of each node of the second set of nodes from the first node of the first set of nodes;
identify a second node in the second set of nodes that is not detectable for beam-based communication by the subject node;
determine an arrangement of the first set of nodes and the second set of nodes in ascending order of physical distance from the subject node;
generate a distance-based mapping including physical distance information using the list of the second set of nodes acquired from the first node of the first set of nodes;
determine one or more nodes present between the subject node and a destination node based on the distance-based mapping;
determine a communication path including the one or more nodes, that are arranged in ascending order of distances from the subject node;
transmit, via beam-based communication by the subject node, content to the destination node based on the communication path, wherein the destination node includes at least one of the first set of nodes or the second set of nodes;
determine a movement of at least one node of the one or more nodes;
update, based on the movement, the distance-based mapping;
determine, based on the updated distance-based mapping, a second communication path including the one or more nodes;
transmit content to the destination node based on the second communication path;
receive, from a node located in front of the subject node, a first map indicating a travel route for the subject node;
generate, based on the distance-based mapping, a second map indicating a travel route for a node located behind the subject node; and
transmit the second map to the node located behind the subject node,
wherein the first travel route for the node located behind the subject node is different than the second travel route for the subject node,
wherein the plurality of network nodes are a group of vehicles traveling on multiple lanes of a road, and
wherein the first travel route and the second travel route are based on a traffic density of the lanes.

10. The subject node as claimed in claim 9, wherein the instructions, when executed by at least one processor, cause the subject node to: form a beam-based communication link with a first node of the communication path; and
transmit the content and destination information of the destination node to the first node of the communication path, wherein the destination information includes an identity of the destination node and instructions to transmit the content to the destination node.

11. The subject node as claimed in claim 10, wherein the instructions, when executed by at least one processor, cause the subject node to:
 determine non-availability of the destination node for beam-based communication with the first node of the communication path;
 identify a second node of the communication path that is available for beam-based communication with the first node of the communication path;
 form a link with the second node of the communication path; and
 transmit the content or the destination information to the second node of the communication path.

12. The subject node as claimed in claim 9, wherein the list of the second set of nodes further comprises information about a relative distance of the second set of nodes from the first node.

13. The subject node as claimed in claim 12, wherein the relative distance is calculated about the first node.

14. The subject node as claimed in claim 12, wherein the instructions, when executed by at least one processor, cause the subject node to generate the distance-based mapping based on a relative distance of each of the first set of nodes from the subject node and the list of the second set of nodes.

15. The subject node as claimed in claim 14, wherein the instructions, when executed by at least one processor, cause the subject node to calculate the relative distance between the subject node and each of the first set of nodes, wherein the relative distance between the subject node and a node from the first set of nodes is determined based on a speed of the subject node, a speed of the node, a serving beam angle between the subject node and the node.

16. The subject node as claimed in claim 9, wherein the instructions, when executed by at least one processor, cause the subject node to:
 detect, during the transmission of the content, the second node to be within a threshold distance from the subject node;
 establish a beam-based communication link with the second node, in response to detecting the second node to be within the threshold distance from the subject node; and
 terminate the beam-based communication link with the first node, after successful establishment of the beam-based communication link with the second node.

\* \* \* \* \*